July 27, 1954         J. B. SMITH         2,684,687
              DIAPHRAGM FLOAT VALVE
              Filed June 8, 1948
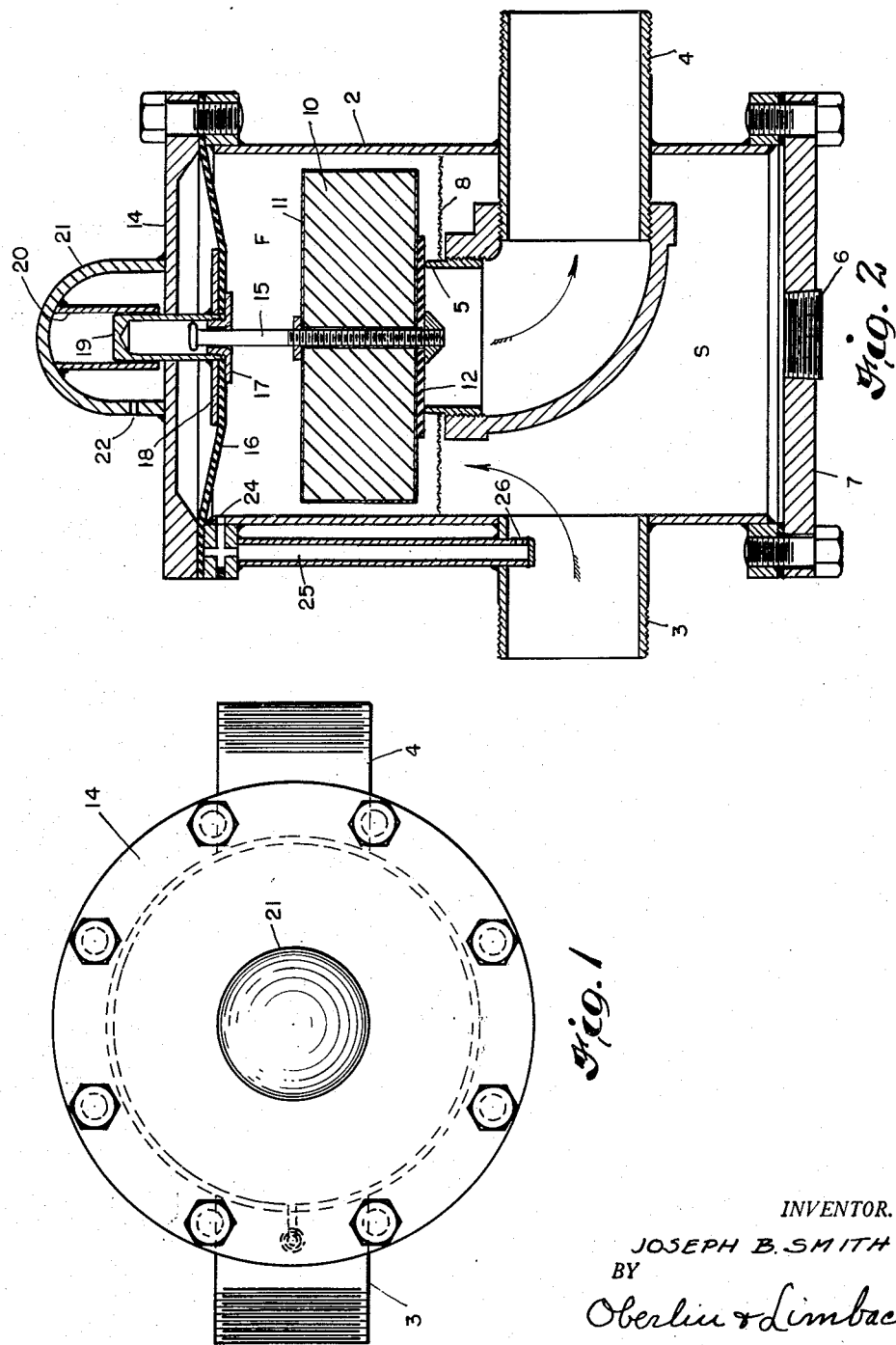
INVENTOR.
JOSEPH B. SMITH
BY
Oberlin & Limbach
ATTORNEYS.

Patented July 27, 1954

2,684,687

UNITED STATES PATENT OFFICE 2,684,687

DIAPHRAGM FLOAT VALVE

Joseph B. Smith, Cleveland, Ohio

Application June 8, 1948, Serial No. 31,728

9 Claims. (Cl. 137—399)

In usages where a number of tanks are connected to a discharge pump line, an undue amount of supervision is required in the opening and closing of the control valves. For instance, in an oil field, after a gauger has turned on a number of tanks to the gathering line system, it is necessary to repeatedly check the respective tanks and close the valves at the proper times. Since the rate of discharge will vary in different tanks, extra trips for the checking are required. Some tanks are likely to be favored by elevation or by proximity to the pumping station, and there may be other variables entering. As soon as a tank is empty, unless the valve be immediately shut, air is drawn into the gathering system, and this causes other tanks to slow down or even stop running. In addition to the necessity of preventing this by close watch on the tanks, the presence of air in the gathering system is extremely detrimental. It promotes evaporation of the light components in the oil, and it occasions precipitation of waxes, thus increasing the flowing friction and necessitating scraper runs. And, in the case of sulphurous crudes, it promotes corrosion of the metal surfaces. Some attempts have been made to mitigate these conditions by automatic valves of float type, with the idea of their being able to close promptly as the oil is drawn out. Unfortunately, the situation is complicated, however, by the pump suction, and has not been reliable, and even for the opening of the valve it has been necessary to have an unseating lever for manual operation in event the valve should stick, and even with this, the gauger may start the tank by manually opening the valve by means of the unseating lever and return later only to find that the valve has re-seated itself instead of allowing the tank to empty. In the present invention a valve construction may be had, however, which is dependably operable automatically, thereby eliminating necessity of supervision, and also eliminating air entry into the pipeline gathering system. Other objects and advantages will appear from the following description.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a plan view of valve construction in accordance with the invention; and Fig. 2 is a vertical sectional view.

The construction includes a housing 2 with an inlet connection 3 and an outlet connection 4, the latter in communication with a valve seat 5. Desirably, the lower portion of the housing may provide a settling chamber S in which bottom settlings and water, etc. may be drawn off from time to time as necessary through a connection 6 in the lower cover 7. The upper portion of the housing provides a float chamber F, and a strainer 8 may be interposed between the upper and lower portions of the housing. Coacting with the valve seat 5 is a closure member 10 which has sufficient buoyancy to allow unseating when the tank contents reaches a predetermined level at which discharge is desired. While the body 10 may be of hollow metal, ordinarily it is preferably of light wood, fir, balsa, cork, etc., sheathed or hermetically sealed in fluid-tight by a sheet metal covering 11. This may be of thin gauge, and it may also be of light metal alloy desirably, as aluminum. An oil-proof rubber-like or synthetic rubber layer 12 at the bottom insures leak-tight closure of the valve against the valve seat 5. A sufficient latitude of movement is provided between the valve seat and the top cover 14, and a valve stem or float stem 15 extending up from the valve 10 extends through a flexible diaphragm 16 at its center, the diaphragm being clamped at its periphery between the housing and the cover plate 14. A nut 17 and disk 18 allowing the valve stem 15 to ride freely therethrough carry also a sleeve 19 which can suitably travel in the guideway 20 carried by the dome 21 on the cover plate 14. As the valve moves up and down, the valve stem may thus freely ride through the diaphragm nut, but the valve stem is flanged at its upper end and if the diaphragm rises appreciably, the nut pushing under the flanged head of the valve stem raises the valve from its seat. The diaphragm thus is movable in part independently of the float, and it effects a delayed-action connection to the valve. The valve is not tripped or "chattered" by every abrupt minor build-up of gas, but the aspirating vent 26 is allowed to perform its function and the diaphragm can operate the valve in the case of excess pressure.

As the diaphragm 16, which may be made of oil-proof synthetic rubber, or metal, seals against the top of the housing, the mounting of the sleeve or diaphragm stud 19 may be sufficiently loose to allow the passage of equalizing air, in the movement of the diaphragm and valve. A vent 22 in the dome 21 leads to the atmosphere. The plate 14 forms a backstop support for the diaphragm so that if forced to the extreme limit, the diaphragm cannot be overstretched and damaged.

Disengaging vapors which tend to accumulate under the diaphragm are removed by way of the opening 24 below the diaphragm, this leading to the conduit 25 which empties into the liquid stream by a vent 26. Even if vapors should abruptly accumulate in the valve chamber to such an extent as to exclude liquid therefrom so that the float could not exert buoyancy, vapor pressure will force the diaphragm to lift the valve and allow such excess vapors to escape through the valve into the pipeline. And the conduit 25 being located at the inlet, as shown, gives a particular aspirating or Venturi-like action, feeding the vapor to the flowing liquid stream at a choke point directly ahead of an expanding zone. The vapor is moved along evenly and cleanly.

The manner of operation of the device is seen from the foregoing. With the tank filled up to its predetermined discharge level, and the pump suction applied to the line, notwithstanding the tendency of the latter to hold the valve to its seat, the fluid pressure on the diaphragm 16 due to the head of liquid in the tank, added to the buoyancy of the valve body, unseats the valve at the proper time and the valve is maintained open until the liquid level drops to the desired point, whereupon the valve 10 closes and prevents the drawing of air into the pipeline gathering system. The proportioning of the buoyant valve body or float 10 and the diaphragm 16 may be as desired in view of tank conditions, capacities, etc.

Other modes of applying the principle of the invention may be employed, change being made as regards the detail described, provided the features stated in any of the following claims, or the equivalent of such, be employed.

I therefore particularly point out and distinctly claim as my invention:

1. In a valve, a housing providing upper and lower chambers, a drain-off at the bottom of the lower chamber, a strainer between the chambers, an inlet connection in the upper portion of the lower chamber, a valve seat and outlet in the lower portion of the upper chamber, a combined float and valve to coact with the valve seat, a stem with an enlarged head extending up from the float, a flexible diaphragm with an upper projection at its center and held at its periphery to the upper portion of the housing, said upper projection from the diaphragm enclosing the head of said stem and including a lost-motion pick-up operative thereon, a guideway for said projection in the upper portion of the housing, and a vent conduit leading from the upper portion of the upper chamber under the diaphragm to the flowing stream of liquid in the inlet of the lower chamber.

2. In a valve, a housing providing upper and lower chambers, a drain-off at the bottom of the lower chamber, a strainer between the chambers, an inlet connection in the upper portion of the lower chamber, a valve seat and outlet in the lower portion of the upper chamber, a combined float and valve to coact with the valve seat, a stem extending up from the float, a flexible diaphragm with a lost-motion pick-up means at its center for said stem and held at its periphery to the upper portion of the housing, and a vent conduit leading from the upper portion of the upper chamber under the diaphragm to the flowing stream of liquid in the inlet of the lower chamber.

3. In a valve, a housing providing upper and lower chambers, a drain-off at the bottom of the lower chamber, a strainer between the chambers, an inlet connection in the upper portion of the lower chamber, a valve seat and outlet at the lower portion of the upper chamber, a valve and a float to coact with the valve seat, a flexible diaphragm with a lost-motion pick-up means at its center for said float and held at its periphery to the upper portion of the housing, and a vent conduit leading from the upper portion of the upper chamber under the diaphragm into the liquid stream in said inlet connection.

4. In a valve, a housing providing upper and lower chambers, a drain-off at the bottom of the lower chamber, an inlet connection to the lower chamber, a valve seat and outlet connected with the upper chamber, a valve and a float to coact with the valve seat, a flexible diaphragm including a guide for the valve and float with a lost-motion pick-up means and having its periphery secured to the uper portion of the housing, and a vent conduit leading from the upper portion of the upper chamber under the diaphragm into the liquid stream in said inlet connection.

5. In a valve, a housing with an inlet and a valve-seat and associated outlet, means for controlling the valve-seat by liquid buoyancy including a float closure member to settle directly on said valve-seat, a stem extending up from said float closure member, and means for controlling the valve-seat by gaseous pressure including a diaphragm with its periphery secured to the housing in the upper portion thereof, and having in its center a delayed-action sliding connection with said stem.

6. In a valve, a housing with an inlet and a valve seat and associated outlet, a combined valve and float cooperating with said valve seat, in the upper portion of said housing a flexible diaphragm secured peripherally to the housing and including a guide for said float with a lost-motion pick-up means therefor, and means for preventing gas pocketing under the diaphragm including an aspirating conduit leading from the upper portion of the housing under the diaphragm into the inlet connection.

7. In a valve, a housing with an inlet and a valve seat and associated outlet, a closure member which is also a float to settle on said outlet valve seat, and a flexible diaphragm with its periphery secured to said housing in the upper portion thereof and including centrally a delayed-action pick-up means for said closure member.

8. In a valve, a housing with an inlet and a valve seat and associated outlet, means for closing said outlet including a float member to settle on said seat, a stem extending up from said float member, and means operable by vapor pressure to raise said float member, including a diaphragm with its periphery secured to said housing in the upper portion thereof, and having a lost-motion connection in its center with said float member stem.

9. In a valve, a housing with an inlet and a valve seat and associated outlet, means for closing said outlet including a float member to settle on said seat, a stem extending up from said float member and having a flanged upper end, and in the upper portion of said housing a flexible diaphragm with its periphery secured to the housing and its center having a guideway in which said stem slides until its flange end is lifted by the diaphragm.

References Cited in the file of this patent

UNITED STATES PATENTS

| Number | Name | Date |
|---|---|---|
| 343,690 | Barry | June 15, 1886 |
| 678,872 | Haward | July 23, 1901 |
| 899,532 | Harrison | Sept. 29, 1908 |
| 947,801 | Cooper | Feb. 1, 1910 |
| 1,390,892 | Eimke | Sept. 13, 1921 |
| 1,466,671 | Mori | Sept. 4, 1923 |
| 1,733,593 | Goodspeed | Oct. 29, 1929 |
| 1,831,318 | Oneil | Nov. 10, 1931 |
| 1,895,084 | Peltier | Jan. 24, 1933 |
| 2,097,815 | Harvey | Nov. 2, 1937 |
| 2,487,876 | Johnson | Nov. 15, 1949 |
| 2,489,461 | Parrish | Nov. 29, 1949 |
| 2,551,404 | Wiggins | May 1, 1951 |
| 2,570,372 | Parrish | Oct. 9, 1951 |